(12) United States Patent
Perez Fernandez

(10) Patent No.: US 10,677,173 B2
(45) Date of Patent: Jun. 9, 2020

(54) CONTROL SYSTEM FOR INTERNAL COMBUSTION ENGINES

(71) Applicant: Amadeo Perez Fernandez, Granada (ES)

(72) Inventor: Amadeo Perez Fernandez, Granada (ES)

( * ) Notice: Subject to any disclaimer, the term of this patent is extended or adjusted under 35 U.S.C. 154(b) by 0 days.

(21) Appl. No.: 16/159,881

(22) Filed: Oct. 15, 2018

(65) Prior Publication Data

US 2019/0345879 A1 Nov. 14, 2019

(51) Int. Cl.
| | |
|---|---|
| *F01L 1/34* | (2006.01) |
| *F02D 13/02* | (2006.01) |
| *F01L 1/053* | (2006.01) |
| *F01L 1/02* | (2006.01) |
| *F02D 41/00* | (2006.01) |
| *F01L 9/02* | (2006.01) |
| *F02B 75/02* | (2006.01) |

(52) U.S. Cl.
CPC .......... *F02D 13/0203* (2013.01); *F01L 1/022* (2013.01); *F01L 1/024* (2013.01); *F01L 1/0532* (2013.01); *F02D 13/0273* (2013.01); *F01L 9/02* (2013.01); *F02B 2075/027* (2013.01); *F02D 2041/001* (2013.01)

(58) Field of Classification Search
CPC .. F02D 13/0203; F02D 13/0273; F01L 1/022; F01L 9/02
USPC .......... 123/90.12, 90.13, 90.16, 90.11, 90.15
See application file for complete search history.

(56) References Cited

U.S. PATENT DOCUMENTS 7,252,058 B2 * 8/2007 Tashiro .................... F01L 1/08
123/90.16

* cited by examiner

*Primary Examiner* — Ching Chang
(74) *Attorney, Agent, or Firm* — Eugenio J. Torres-Oyola; Victor M. Rodriguez-Reyes; Ferraiuoli LLC

(57) ABSTRACT

A control system for internal combustion engines having four valves per cylinder. An inlet valve and an exhaust valve are controlled by a basic camshaft. Another inlet valve and another exhaust valve are controlled by a control camshaft. The two camshafts are connected to a crankshaft and engine torque is managed by an electronic control unit. The system comprises a motor/generator unit, connected to the control camshaft; a differential, connected to the crankshaft and to the control camshaft; a control shaft, connected to the differential; an actuator, connected to the control shaft; a one-way restrictor valve connected to a shut-off valve and to the actuator; an oil circuit, connected to the actuator by means of the shut-off valve and a control solenoid that acts on the shut-off valve.

5 Claims, 6 Drawing Sheets

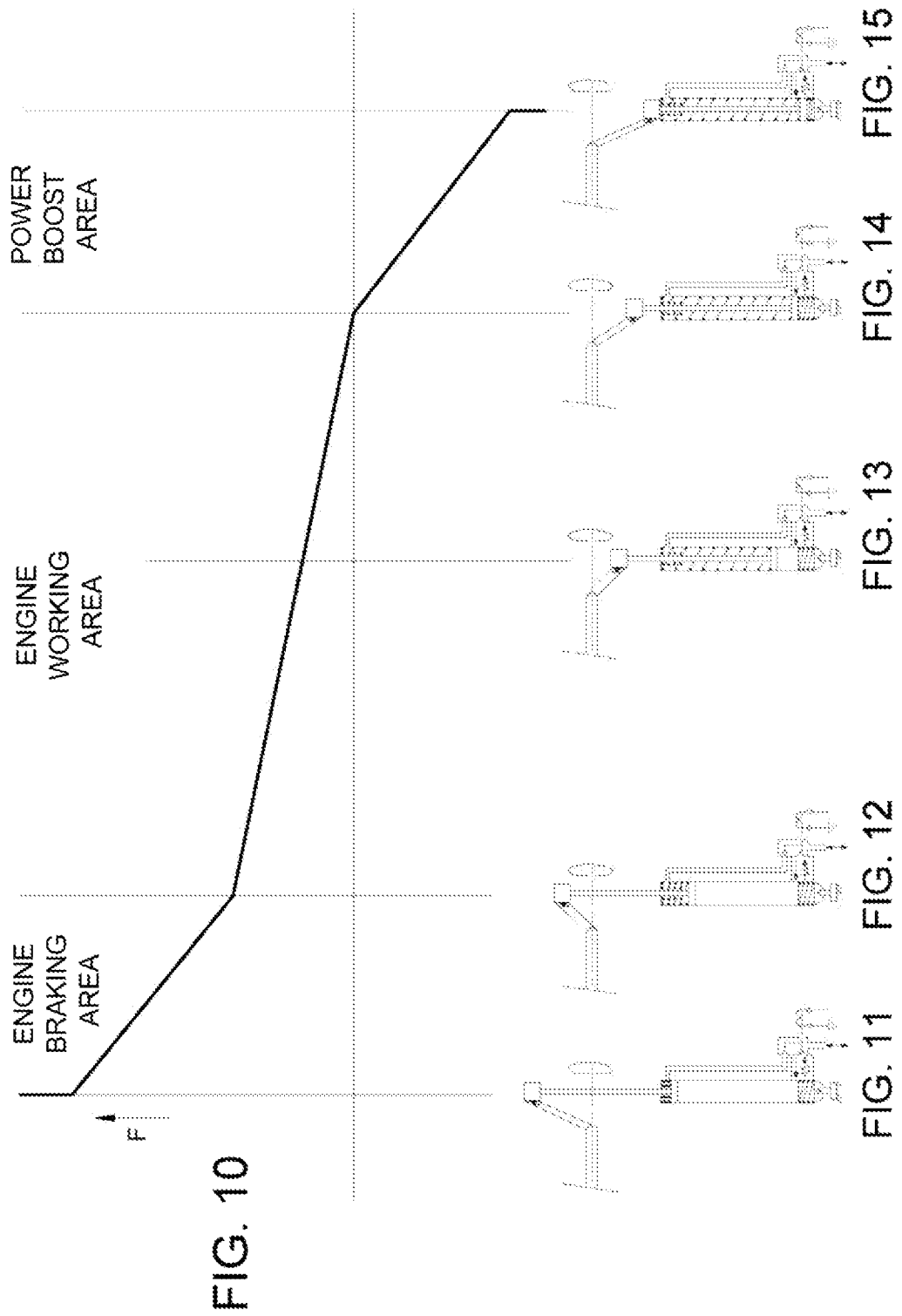

CONTROL SYSTEM FOR INTERNAL COMBUSTION ENGINES

OBJECT OF THE INVENTION

The present invention relates to a control system for internal combustion engines, which optimises the cycle executed by said engines, varying the moment in which the different valves that execute the cycle act.

The system is applicable to the automotive industry, specifically in the motor vehicle engine industry.

Background of the Invention and Technical Problem to be Solved

In a four-stroke internal combustion engine, both air intake and gas expulsion are controlled by the opening of the respective inlet and exhaust valves, which move by means of a camshaft connected to the crankshaft by means of a timing belt or chain.

Entry to the different cylinders through the inlet valves is executed by means of a common intake manifold that includes a butterfly valve whereby the air flow that enters the cylinders is controlled.

Similarly, the exhaust valves of the different cylinders are connected to the exhaust pipe.

A gasoline engine follows a basic four-stroke Otto cycle, wherein a full four-stroke cycle is executed for every two turns of the crankshaft: intake, compression, expansion and exhaust. In the interior of each of the cylinders, a piston executes a linear and alternative motion between a top dead centre and a bottom dead centre. When the piston is close to the top dead centre, the inlet valve opens to allow the passage of air into the cylinder. During the intake phase, in the downward movement of the piston from its closest position to the valves, at the top dead centre, suction is generated that contributes to filling the cylinder. In the case of indirect injection engines, fuel is injected into the air contained in the intake manifold, due to which the air that enters the cylinder is already mixed with fuel.

When the piston comes near the bottom dead centre or exceeds it slightly, the inlet valve is closed. In direct injection engines, it is at this point when the fuel is usually injected in the cylinder.

In any of the two cases, with direct or indirect injection engines, fuel consumption is proportional to the volume of air that enters the cylinder. This value is proportional to the torque value generated by the engine. Therefore, in those cases where fuel consumption must be reduced and, therefore, engine torque, i.e. in situations where the objective pursued is not to obtain maximum power, but rather to reduce consumption, the amount of air intake must be reduced. This is achieved by partially closing the butterfly valve of the intake manifold. This valve movement effectively reduces air flow, but significantly increases pumping losses and degrades engine performance.

To overcome this drawback, it is necessary to act on the air intake diagram in order to reduce the pumping losses responsible for this degradation of performance.

For such purpose, two possible applications of the Atkinson cycle can be used in order to reduce the amount of air present in the cylinder:

early inlet valve closing (EIVC) during the intake phase, reducing diagram opening time so as to intake a smaller amount of air in the cylinder, or late inlet valve closing (LIVC), lengthening diagram opening time. In this case the aim is to close the inlet valve after the piston exceeds the bottom dead centre to achieve an effect such that part of the intake air, whether pure or mixed with fuel, is evacuated when the cylinder is in the compression phase, thereby reducing part of the air mass present in the cylinder.

These two approaches make it possible to significantly reduce pumping losses, thereby improving engine performance under partial load conditions in order to reduce fuel consumption.

In the state of the art a variety of devices are known to which the aforementioned solutions are applied to modify the inlet valve timing diagram in a cylinder according to the Atkinson cycle, in order to improve engine performance at mid- and low-range torque.

In particular, systems capable of applying different possible timing diagrams to the inlet valve, which can be selected according to need. These systems include at least two cams with different lifts and opening times. The thrust, finger bar or rocker organ has an interlocking system which allows the valve to move according to one of the available timing diagrams. Systems in which the inlet valve performs different timing diagrams in accordance with torque at which the motor works are usually systems that use hydraulic control over their constituent elements.

Document U.S. Pat. No. 52,331,048 is known in the state of the art, which discloses a method for operating an internal combustion engine whose combustion chambers, associated with each of the pistons, have, at least, two inlet valves that include an engine load determination stage. When the engine is under partial load, a phase shift stage in the inlet valve lifts to generate a lift law equivalent to a broad intake law to execute the Atkinson cycle. In this manner, the phase shift is obtained by means of a device that includes a first cam for controlling a first inlet valve, disposed in a first camshaft, and a second camshaft for controlling a second inlet valve, linked to a second camshaft, concentric to the first camshaft and disposed in the interior of the first camshaft, being said second camshaft associated with an angular phase shifter suitable for varying the angular position of a cam by rotation of a camshaft with respect to the other. According to the invention, the second cam is linked to the second camshaft by an actuation carrier, said carrier moving in a notch on the first camshaft and because two camshafts are linked and actuated by a single pulley, in turn actuated by a belt, being said second camshaft also actuated by this belt.

The systems used by the leading automobile manufacturers to achieve this effect are also known, such that each system used by each manufacturer is known by its own name. The most well-known systems include VTC by Citroen, Valvetronic by BMW, Valvematic by Toyota, Vtec by Honda, MIVEC by Mitsubishi, Variocam Plus by Porsche, Camtronic by Mercedes, Valvelift Valve Timing by Audi or MultiAir by Fiat, all comprehensively disclosed and easily accessible in industry-related literature.

However, these systems have a series of problems, such as the need to use hydraulic energy that affects final power or the lack of torque continuity, making it impossible to progressively adjust the passage of one distribution diagram to another and behaving in one manner at low power and in another at high power, discreetly and without any type of continuity. Furthermore, in the event of using electric engines, which make it possible to accurately control the system under different torques, they are slow-response systems because they require great demultiplication. Additionally, the maximum phase shift they can provide is limited.

In any case, all these systems are mechanically complex to a greater or lesser extent, since they have small parts subjected to an oscillating movement that compromises their robustness.

The present invention eliminates these problems through a novel system which avoids the use of a multitude of moving pieces and a certain work situation is offered in accordance with the load at which the engine is working at any given time.

DESCRIPTION OF THE INVENTION

The object of the present invention is a control system for internal combustion engines having four valves per cylinder that use two camshafts: a basic camshaft and a control camshaft.

The basic camshaft controls the movement of a first inlet valve and of a first exhaust valve. The control camshaft controls the movement of a second inlet valve and of a second exhaust valve, per cylinder.

The two camshafts are connected to a crankshaft and engine torque is managed by an electronic control unit.

By way of main features, the system comprises a motor/generator unit, connected to the control camshaft; a differential, connected to the crankshaft and to the control camshaft; a control shaft, connected to the differential and capable of rotating; an actuator, connected to a control shaft, capable of moving relatively to the control shaft; a one-way restrictor valve connected, on the one hand, to a shut-off valve and, on the other, to the actuator; an oil circuit, connected to the actuator by means of the shut-off valve and a control solenoid capable of acting on the shut-off valve.

When a change occurs in vehicle torque, the electronic vehicle control unit sends a signal to both the motor/generator unit and to the control solenoid. Upon receiving this signal, on the one hand, the motor/generator unit is activated, causing a variation in the rotation of the control camshaft which, on being connected to the differential, goes out of phase with respect to the basic camshaft. The control shaft absorbs this phase shift and, upon rotating, exerts a force on the actuator. On the other, the control solenoid activates the shut-off valve, enabling the passage of oil between the oil circuit and the actuator by means of the one-way restrictor valve.

Then, the actuator exerts a reaction force on the control shaft. Upon reaching equilibrium, the control solenoid is deactivated and the shut-off valve is closed, whereupon the control shaft is phased out at a certain angle.

The actuator may be a cylinder divided into a first chamber and into a second chamber by means of a piston joined to a rigid shaft, located in the first chamber, wherefrom a free end of the rigid shaft protrudes, wherethrough it is joined to the control shaft. This chamber houses a spring coaxial to the piston shaft. The second chamber is joined to the oil circuit by means of a restrictor valve and a shut-off valve controlled by a control solenoid.

The first chamber may be joined to the oil circuit by means of a second shut-off valve which is also controlled by a control solenoid.

In order to work in extreme situations, both the first chamber and the second chamber of the actuator comprise an additional spring to resist the force exerted by the piston.

The control solenoid may be deactivated, such that the energy generated by the motor/generator unit may be used to recharge the battery, to feed another device of the vehicle or a mixture of the two, as required.

DESCRIPTION OF THE FIGURES

In order to complete the description being made and make the characteristics of the invention more readily understandable, in accordance with a preferred embodiment thereof, a set of drawings is attached as an integral part thereof, wherein the following figures have been represented in an illustrative and non-limiting manner:

FIG. 10 shows a diagram of forces required of the control shaft in different engine operation situations.

FIGS. 11 to 15 show different moments in the operation of the actuator in accordance with the force required by the control shaft.

Following is a list of the references used in the figures:
1. Crankshaft.
2. Basic camshaft.
3. Control camshaft.
4. Differential.
5. Motor/generator unit.
6. Control shaft.
7. Actuator.
8. First actuator chamber.
9. Second actuator chamber.
10. Piston.
11. Rigid shaft.
12. Spring.
13. One-way restrictor valve.
14. Shut-off valve.
15. Control solenoid.
16. Oil circuit.
17. Crank.
18. Calibrated hole.
19. First additional spring.
20. Second additional spring.
AA1. Opening of the basic camshaft inlet valve.
CA1. Closing of the basic camshaft inlet valve.
AE1. Opening of the basic camshaft exhaust valve.
CE1. Closing of the basic camshaft exhaust valve.
AA2. Opening of the control camshaft inlet valve.
CA2. Closing of the control camshaft inlet valve.
AE2. Opening of the control camshaft exhaust valve.

CE2. Closing of the control camshaft exhaust valve.

PREFERRED EMBODIMENT OF THE INVENTION

In order to overcome the technical problem raised in the preceding section of this specification, the object of the invention provides a control system for internal combustion engines.

The control system that is the object of the invention is developed for multivalve engines, preferably four valves per cylinder: two inlet and two exhaust valves. Two camshafts (2, 3) are required for the operation thereof.

The control system may also be used in engines with a different valve distribution such as, for example, those with three valves per cylinder or five valves per cylinder.

The first camshaft is a basic camshaft (2) with the function of controlling the opening and closing movements of a first inlet valve and of a first exhaust valve of each cylinder.

The second camshaft is a control camshaft (3) which is in charge of controlling the opening and closing movements of a second inlet valve and of a second exhaust valve of each cylinder.

An object of the present invention is a control system wherein a phase shift is provided, in each cylinder, upon opening, upon closing or in both cases, the second inlet valve with respect to the first.

Another object of the present invention is a control system wherein a phase shift is provided, in each cylinder, when opening, when closing or in both cases, the second exhaust valve with respect to the first.

Following is a description of a form of operation of the engine in accordance with the relative position of the camshafts (2, 3). Since the control system only acts on the control camshaft (3), the first valves, both inlet and exhaust, controlled by the basic camshaft (2), are not altered in any way and the opening and closing times remain unchanged. However, it is the second valves, inlet and exhaust, controlled by the control camshaft (3), which undergo changes in opening and closing times.

Figure 1:
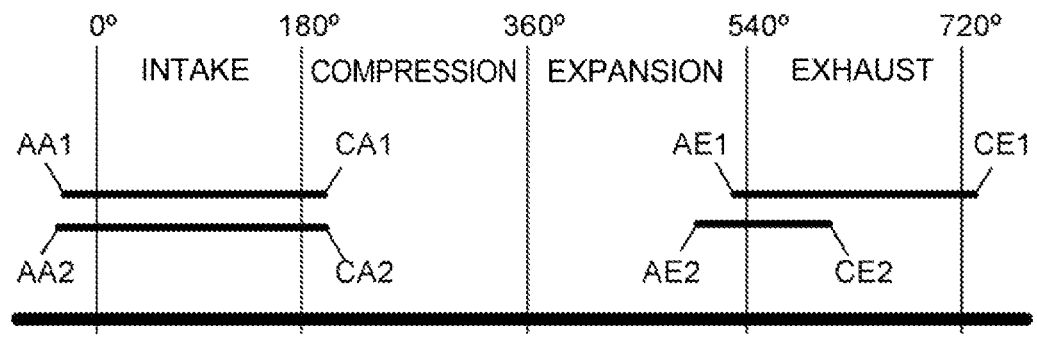
FIGS. 1 and 2 show corresponding views of a four-stroke cycle operation diagram performed by a cylinder showing the different opening and closing times of the inlet and exhaust valves with the engine working at maximum power and at minimum power, respectively.

Thus, FIG. 1 shows a distribution diagram for the operation of the cylinder of an engine at maximum power. The control camshaft (3) works in phase with respect to the basic camshaft (2). The two inlet valves have synchronised opening and closing times. As regards the exhaust valves, both the opening (AE2) and closing (CE2) of the second exhaust valve are advanced with respect to the first exhaust valve. It can be observed that the total opening time of the first exhaust valve is much longer than that of the second exhaust valve. This can be explained by the fact that the closing of the exhaust valves marks the end of the cycle and extending it means entering the intake phase of the next cycle, which would be highly detrimental to the evaluation of the performance of the next cycle. The distribution system is interesting in that the volume of gases generated at maximum power is substantially larger than at any other moment of engine torque, due to which it is of interest to have a longer time period for gas exhaust. In this manner, the opening of the second exhaust valve (AE2) occurs before the piston reaches the bottom dead centre. The closing of the second exhaust valve (CE2) is advanced, as mentioned earlier, although the closing of the first exhaust valve (CE1), of the basic camshaft (2), remains unchanged, due to which it still remains open and allows continued gas exhaust, due to which total opening time does not decrease.

Figure 2:
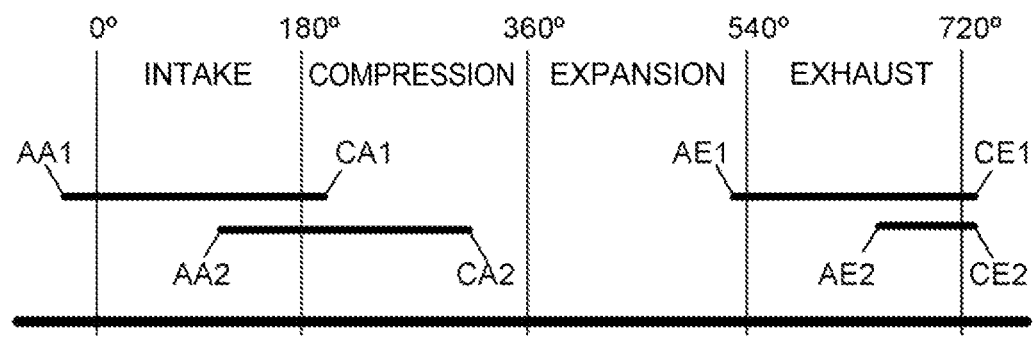

FIG. 2 shows a distribution diagram for the operation of an engine at minimum power. In this case, the control camshaft (3) is delayed with respect to the basic camshaft (2). This implies that the opening and closing moments of the second inlet and exhaust valves have been delayed in the same proportion. In this manner, on the one hand, the opening and closing (CA2) of the second inlet valve is delayed with respect to the first inlet valve. The delayed opening of this valve (AA2) does not affect the start of air intake in the cylinder, since the opening of the first inlet valve (AA1) has already occurred. The delayed closing of the valve (CA2) implies that, during the compression phase, part of the air that is already inside the cylinder, whether pure or mixed with fuel, will be expelled from the cylinder through the valve towards the intake manifold to be recirculated and used in the following cylinder. In this case, the amount of air remaining inside the cylinder is smaller, reducing the consumption at the expense of a reduction in power which is in fact unnecessary.

The control system of the invention is in charge of executing the delay in the opening and closing of the second valves, creating a phase shift in the rotation of the control camshaft (3) with respect to the basic camshaft (2). The configuration of the control system and operation thereof is as described below:

As described earlier, the control system of the invention is applied to engines that include a crankshaft (1) connected to two camshafts (2, 3) identified as a basic camshaft (2), since it fulfils the function of any camshaft, without further requirements, and a control camshaft (3), since it controls the phase shift of the valves associated thereto.

Figure 3:
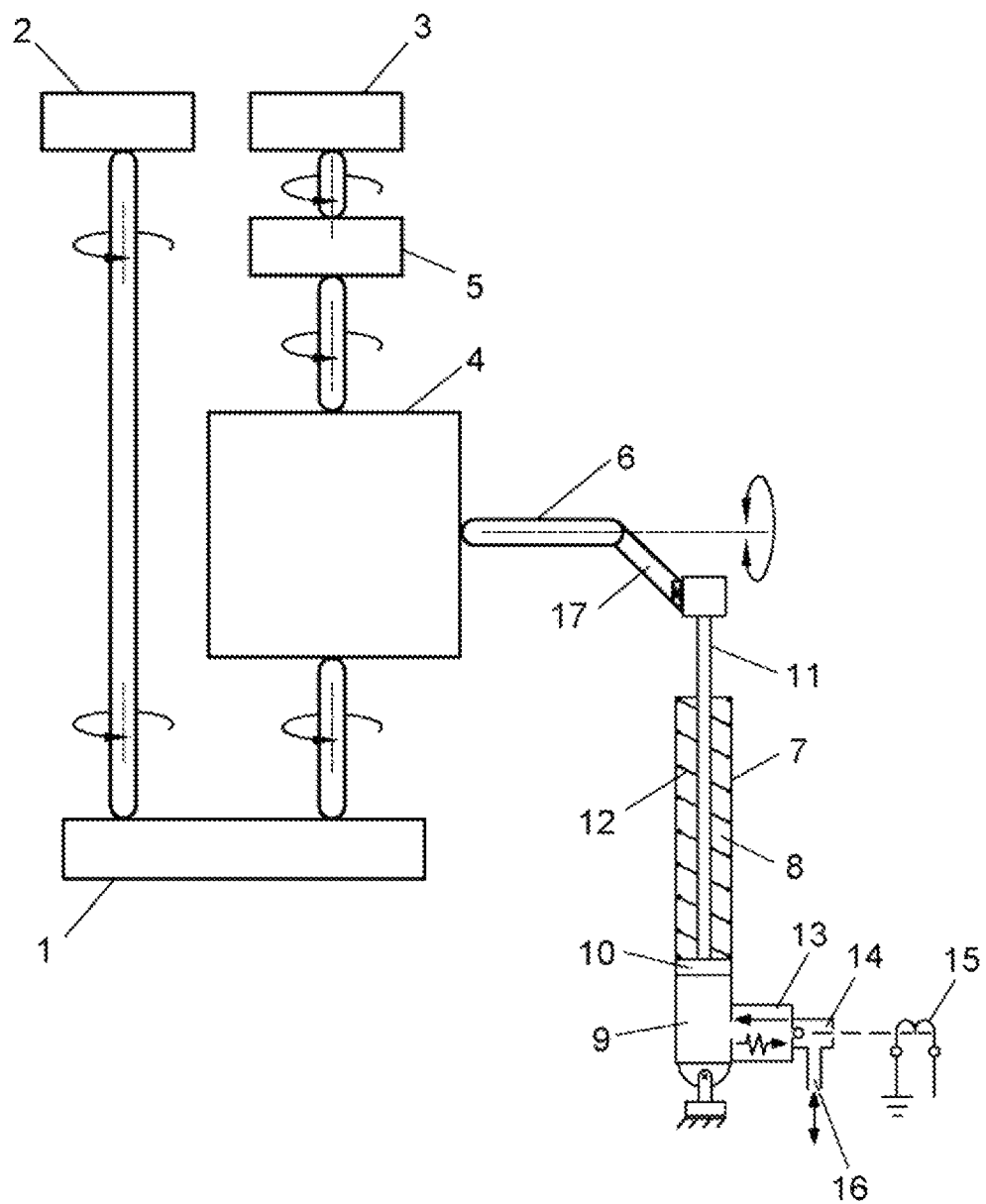
FIG. 3 shows a schematic view of the control system for internal combustion engines that is the object of the invention.

As shown in FIG. 3, the control system of the invention comprises a motor/generator unit (5) mechanically connected to the control camshaft (3).

The control system also comprises a differential (4) which is located between the crankshaft (1) of the vehicle and the control camshaft (3). The differential (4) may be directly connected to the control camshaft (3) or through the motor/generator unit (5).

The third shaft connected to the differential (4) is a control shaft (6). The rotation of the crankshaft (1) and control camshaft (3) is synchronised in a stable control shaft (6) torque position. This implies that the control camshaft (3) rotates without phase shift with respect to the basic camshaft (2) and the inlet and exhaust valves of each cylinder determine an optimal distribution diagram to obtain maximum power, such as that represented in FIG. 1.

The control shaft (6) is connected to an actuator (7) by means of a crank (17) that enables it to rotate at a certain angle and keep it stable.

In the example of embodiment, the actuator (7) is a cylinder with a piston (10) that divides the actuator (7) into two chambers (8, 9). On the one hand, in the actuator (7) there is a piston (10), joined to a rigid shaft (11), coaxial to the actuator (7) and that crosses a first chamber (8) of the actuator (7) and, on the other, a spring (12) coaxial to the rigid shaft (11) and to the actuator (7), located in this same first chamber (8). The rigid shaft (11) projects from the actuator (7) and is joined by its free end to the control shaft (6) by means of a crank (17), whereby the actuator (7) is joined to the control shaft (6).

The second chamber (9) of the actuator (7) is connected to an oil circuit (16) through a one-way restrictor valve (13) and a shut-off valve (14).

The restrictor valve (13) is a mechanical actuation valve having a fluid passage hole, which is closed by means of a plug, and a substantially smaller calibrated hole (18). The pressure of the fluid is sufficient to overcome the restrictor valve (13) plug in one direction in order to flow through it.

In the opposite direction, passage is restricted to exclusively flowing through the calibrated hole (18). In this case, the pressure of the fluid on the plug is in the passage blocking direction.

Thus, the restrictor valve (13) fulfils two functions. On the one hand, when closed, it restricts the outflow of oil from the second chamber (9) of the actuator (7), which can only take place through the calibrated hole (18), which prevents the fast expansion of the spring (12). On the other, when open, it enables the free passage of the oil in the opposite direction, from the oil circuit (16) to the actuator (7), thereby enabling the fast compression of the spring (12) and the filling of the second chamber (9) of the actuator (7) with oil. Between the oil circuit (16) and the restrictor valve (13) there is a shut-off valve (14) which is actuated by means of a control solenoid (15) that opens or closes an oil passage hole.

Following is a description of an example of operation of the present invention.

In principle, it should be noted that the control system of the present invention is focused on optimising operation at partial load torques and on recovering kinetic energy during deceleration, without affecting engine operation at full load.

On the one hand, the motor/generator unit (5), moved together with the control camshaft (3), is in charge of determining the resistance to rotation of the assembly: The current requirements of the motor/generator unit (5) create a torque requirement that is inversely proportional to the power requirement. In situations where less power is required, this causes the motor/generator unit (5) to brake the control camshaft (3), creating, through the differential (4), a phase shift with the crankshaft (1) which in turn causes rotation of the control shaft (6). This implies that the control camshaft (3) has been delayed with respect to the basic camshaft (2) proportional to the control shaft (6) rotation value.

In this manner, due to the deceleration situation, the control shaft (6) rotates in the direction of compression of the actuator (7) spring (12). Control shaft (6) stability is achieved upon levelling the force produced by the motor/generator unit (5), which makes it rotate, with the compression force of the spring (12). Therefore, this equilibrium can be calibrated in accordance with the constant of the spring selected.

Thus, the compression of the spring (12) during deceleration implies an increase in the free length of the second chamber (9) of the actuator (7), creating a depression that causes the restrictor valve (13) to open, allowing the passage of oil from the oil circuit (16) up to the second chamber (9) of the actuator (7), as described above.

Furthermore, the control solenoid (15) causes the shut-off valve (14) to open, allowing the passage of oil from the oil circuit (16) to the actuator (7).

Once the control shaft (6) is stabilised, the control solenoid (15) receives a signal from the ECU to close the shut-off valve (14), such that oil cannot circulate between the oil circuit (16) and the actuator (7).

This implies that the control camshaft (3) is out of phase with respect to the basic camshaft (2) and the engine works with a distribution diagram such as that shown in FIG. 2 under the conditions described above.

Thus, when the vehicle decelerates, both the motor/generator unit (5) and the control solenoid (15) receive a signal from an electronic control unit or ECU that the vehicle must decelerate and enter into a situation of less torque and greater fuel savings requirements. This means that fuel savings prevail over power delivery.

As in the case of deceleration, in the case of acceleration of the vehicle, the motor/generator unit (5) and the control solenoid (15) also receives a signal from the ECU. The motor/generator unit (5) causes the same movement of the control shaft (6), except in the opposite direction, whereupon the actuator (7) spring (12) expands instead of compressing. Furthermore, the control solenoid (15) also opens the shut-off valve (14) and the oil flows out in a restricted manner through the calibrated hole (18) of the restrictor valve (13) from the second chamber (9) of the actuator (7) to the oil circuit (16), since the restrictor valve (13) closed.

Figure 4:
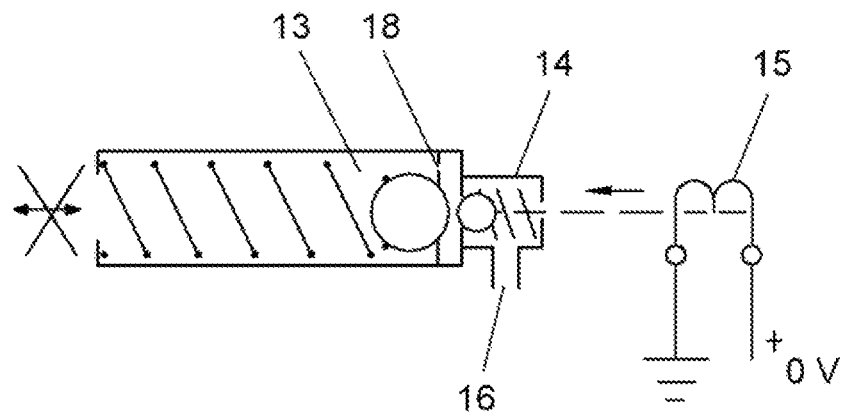
FIGS. 4 to 6 show the operation of the shut-off and restrictor valves for the passage or blocking of oil between the oil circuit and the actuator in situations of stable engine torque, acceleration and deceleration, respectively.
Figure 5:
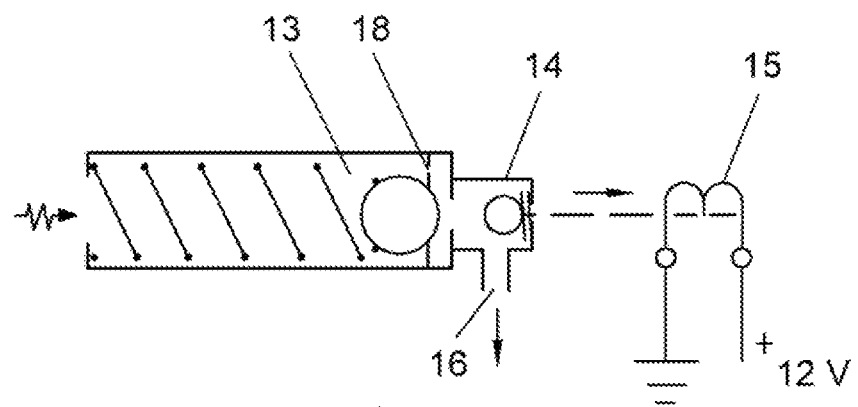
Figure 6:
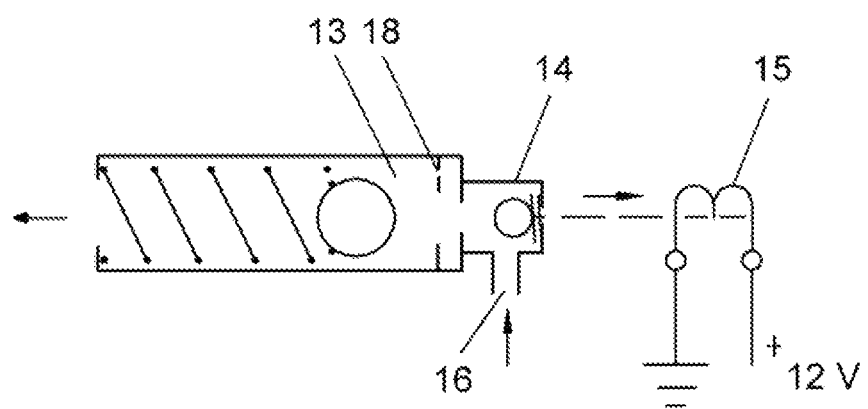

An explanation of the oil flow between the second chamber (9) of the actuator (7) and the oil circuit (16) is shown in FIGS. 4 to 6 and is described below.

FIG. 4 shows a situation of equilibrium of the control shaft (6). In this situation, there is no oil flow in any direction. The restrictor valve (13) blocks the passage hole of the oil from the actuator (7) to the oil circuit (16). The calibrated hole is open and oil can circulate therethrough, although the shut-off valve (14) blocks the passage of oil, leaving the restrictor valve (13) is watertight. The shut-off valve (14) also blocks the oil passage hole in the opposite direction, i.e. from the oil circuit (16) to the actuator (7).

FIG. 5 shows a situation wherein the engine is in the acceleration phase. In this situation, one the one hand, the control solenoid (15) receives a signal from the ECU to open the shut-off valve (14). On the other, the control shaft (6) rotates, causing the actuator (7) spring (12) to expand and the piston (10) to expel oil from the second chamber (9) of the actuator (7) into the oil circuit (16), which will circulate through the calibrated hole, since the passage hole of the restrictor valve (13) is closed. Oil outflow speed is limited by the size of the calibrated hole.

FIG. 6 shows a situation wherein the engine is in the deceleration phase. In this case, the control solenoid (15) also receives a signal from the ECU to open the shut-off valve (14). Also, the control shaft (6) rotates in the opposite direction to that of the previous situation, such as to cause the compression of the actuator (7) spring (12). The second chamber (9) of the actuator (7) is enlarged, creating a depression that causes the restrictor valve (13) to open, absorbing oil from the oil circuit (16).

In this manner, it reflects how the operation of this control assembly is focused mainly on maintaining a stable equilibrium position reached by the control shaft (6), with the corresponding phase shift of the control camshaft (3), and on preventing small oscillations that may occur in the differential that would cause oscillations in the control shaft (6) without having varied engine torque.

In a second embodiment, not shown in the figures, focused on situations where the force provided in the control shaft (6) is very large and the second chamber (9) of the actuator (7) could be emptied, a design wherein the oil circuit (16) is considered, also connected to the first chamber (8) of the actuator (7) by means of a second shut-off valve (14) and a second control solenoid (15), operating synchronously with the first, such that this first chamber (8) is also filled with oil, preventing the sudden compression of the spring (12).

Figure 7:
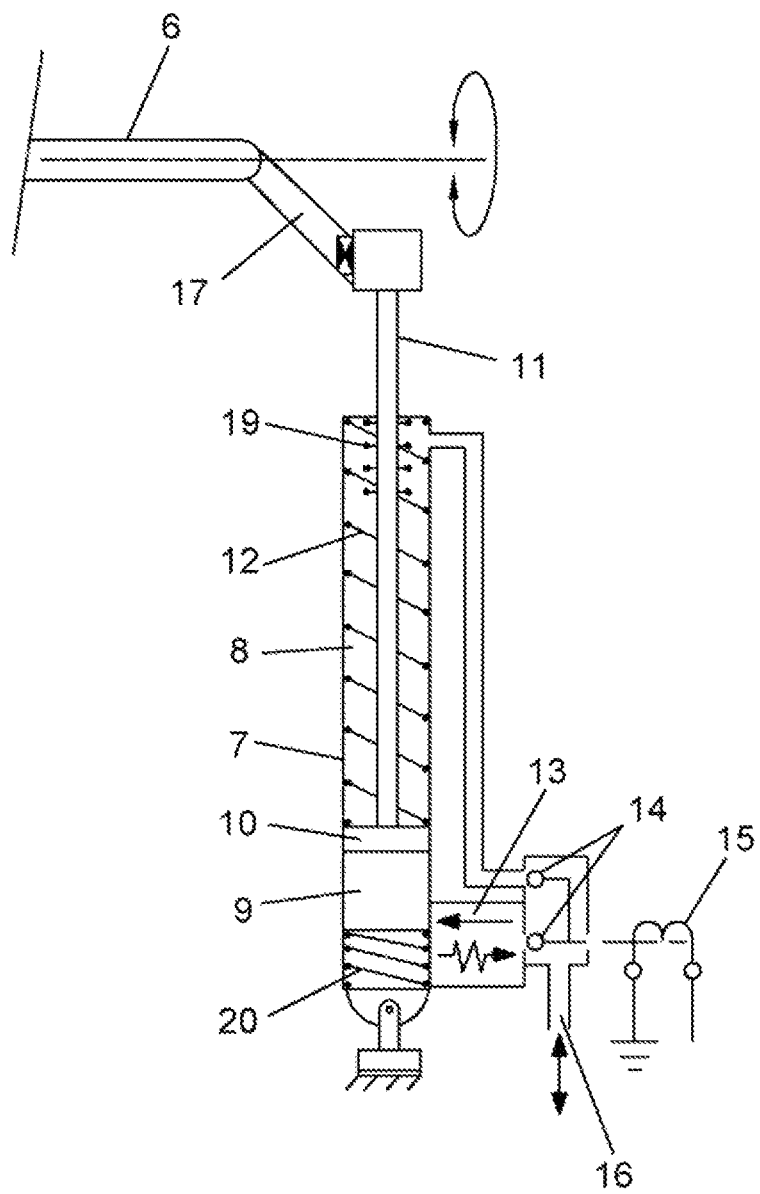
FIG. 7 shows a second embodiment of the actuator.

In another embodiment, as shown in FIG. 7, the first chamber (8) of the actuator (7) is connected to the oil circuit (16) by means of the second shut-off valve (14) also controlled by the control solenoid (15), which now controls the two shut-off valves (14) simultaneously. Also, the actuator (7) includes a first additional spring (19) located in the first chamber (8) of the actuator (7) and a second additional spring (20), located in the second chamber (9) of the actuator (7). The two additional springs (19, 20) are fixed to the ends of the respective chambers (8, 9) and have the function of exerting a force against the movement of the piston (10) in extreme movements of the control shaft (6). To this end, the force exerted by these additional springs (19, 20) is much greater than the force exerted by the initial spring (12). In this manner, two extreme operating modes are created that exceed the normal engine working operating setup, one for the engine brake, with extra delay, and another for power boost, with extra forward movement, with broad valve crossing, in a more sporty setup.

Figure 8:
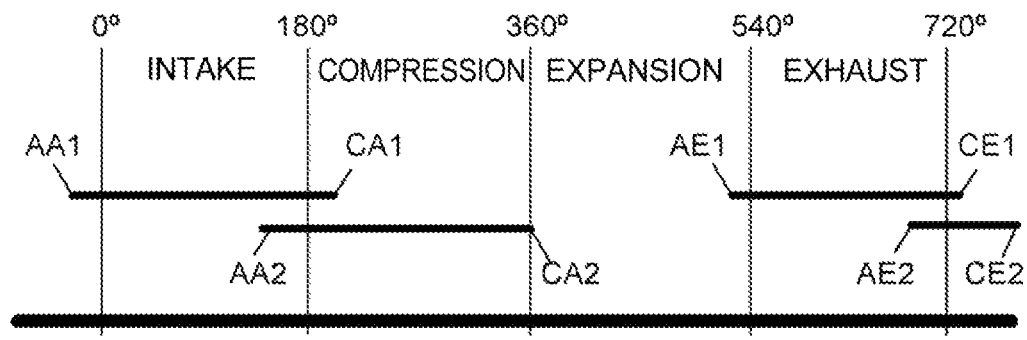
FIGS. 8 and 9 show corresponding views of a four-stroke cycle operation diagram performed by a cylinder, showing the different opening and closing times of the inlet and exhaust valves with the engine brake and power boost area, respectively.
Figure 9:
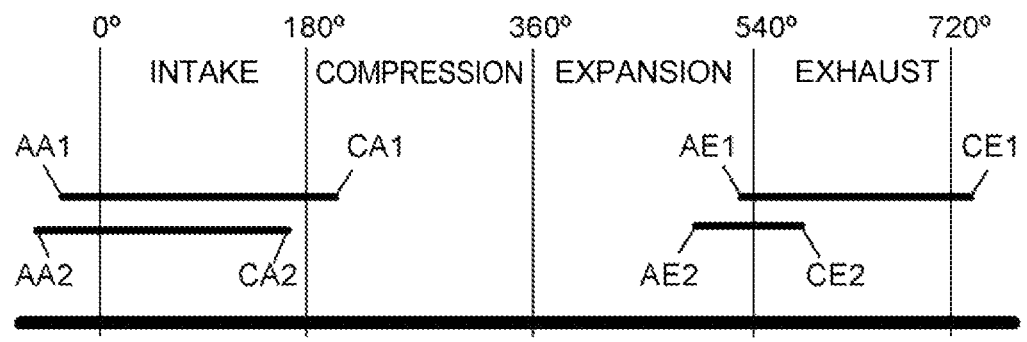

The movements of the valves for these two new situations are shown in FIGS. 8 and 9, with the engine working, respectively, in the engine brake area and in the power boost area.

FIG. 10 shows a diagram of forces borne by the piston (10) in each of the situations in which the engine works. The value of the force exerted by the springs (12, 19, 20) on the piston (10) is represented on the X-axis and the different positions of the actuator (7) are represented on the Y-axis. The position of the actuator (7) is represented in FIGS. 11 to 15 for the most significant positions of the process.

Thus, FIG. 11 shows an engine brake position, wherein the piston (10) acts on the first additional spring (19), located in the first chamber (8).

FIG. 12 shows an idle position, wherein the piston (10) has not yet begun to act on the first additional spring (19), located in the first chamber (8), wherein the piston (10) is in the limit position.

FIG. 13 shows a partial engine power position, in an acceleration process such as those described in the other embodiment of the actuator (7) with a single spring (12).

FIG. 14 shows a normal maximum power position, wherein it can be observed that the force required on the actuator (7) is zero. In this case, the piston (10) is in the limit position before beginning to act on the second additional spring (20), located in the second chamber (9). Thus, if the force exerted on the actuator (7) is null, the actuator (7) will tend to take the engine to said situation of normal maximum power if the shut-off valve (14) is open. This is so because, in the case of failure of the ECU or of the motor/generator unit (5), the engine could continue to operate normally by simply opening the shut-off valve (14), controlling the intake air with a conventional reserve butterfly valve which, in the other case, remains open.

FIG. 15 shows a power boost position, wherein the piston (10) acts on the second additional spring (20), located in the second chamber (9).

FIG. 10 shows how the function of the additional springs (19, 20), located on the ends of each of the chambers (8, 9) of the actuator (7), is to considerably increase the curve slope, i.e. increase the force required from the piston (10) to a large extent for small torque changes, when the piston (10) comes into contact with them in order for the retention and power boost areas to be perfectly delimited.

The response speed in deceleration may be as high as desired by simply assembling the motor/generator unit (5) with the appropriate dimensions. With regard to acceleration, the limit would be imposed by the force of the springs (12, 19, 20) and the restriction that the restrictor valve (13) allows according to its design, mainly in relation to the size of the calibrated hole (18).

In fact, the motor/generator unit (5) could even replace the vehicle generator. In this case, it suffices to block the function of the control solenoid (15) and allow the cylinder valves to continue to function according to the distribution diagram they followed until now. In such cases, the electricity generated by the motor/generator unit (5) is intended for recharging the vehicle batteries or for covering the electricity consumption of other devices of the vehicle.

In any case, the motor/generator unit (5) can also act as an electric engine to collaborate in acceleration situations, depending on the manner in which it is required. In this manner, the motor/generator unit (5) could even replace the starter engine.

It should be noted that, with the shut-off valve (14) open, a situation of equilibrium can be reached in all positions by opposing the action of the motor/generator unit (5), by means of the force exerted on the actuator (7) by the control shaft (6), against the action of the springs (12, 19, 20). And, upon reaching equilibrium and closing the shut-off valve (14), the force on the piston (10) of the actuator (7) is counteracted by the pressure of the oil inside the chambers (8, 9).

In the acceleration process, the energy consumed by the motor/generator unit (5), when it propels the control shaft (6), is transmitted to the combustion engine and, therefore, not only orders acceleration but also contributes to said acceleration.

In the deceleration process, the currents generated by the motor/generator unit (5) not only force the combustion engine to reduce its torque, but also recover the kinetic energy that may be stored.

On the contrary, when the shut-off (14) is closed, the combustion engine maintains its fixed features, while the motor/generator unit (5) can, as appropriate, either generate energy for other current or subsequent uses or contribute to the movement of the vehicle.

In this manner, two functions are performed simultaneously. On the one hand, the combustion engine is controlled without energy consumption and, on the other, creates a hybrid engine assembly with both the electric and combustion engine in perfect sync.

Therefore, not only is retention capacity also superior to that of a conventional engine, but with the system of the invention combustion engine performance is improved and, not only is its maximum output power not affected, but it can also be increased as required.

A preferred embodiment of the invention has been described in this section and other embodiments can be developed on the basis of said description. Therefore, the actual scope of the invention is conferred by the claims attached below.

The invention claimed is:

1. A control system for internal combustion engines having four valves per cylinder that use a basic camshaft, through which the movement of a first inlet valve and of a first exhaust valve is controlled, and a control camshaft, through which the movement of a second inlet valve and of a second exhaust valve is controlled, per cylinder, wherein both the basic camshaft and the control camshaft are connected to a crankshaft and wherein engine torque is managed by an electronic control unit, responsible for regulating the operation of a vehicle's electronic systems, comprising:
 a motor/generator unit connected to the control camshaft;
 a differential gear connected to the crankshaft and to the control camshaft;
 a control shaft, through which a phase shift between the basic camshaft and the control camshaft is controlled, that is connected to the differential gear, capable of rotating;
 an actuator, a device comprising a shaft and with capacity to react on the shaft, that is connected to the control shaft, capable of moving relatively to the control shaft;

a one-way restrictor valve, connected on one side to a shut-off valve and, on the other, to the actuator;

an oil circuit connected to the actuator through the shut-off valve;

a control solenoid capable of acting on the shut-off valve;

wherein, when a change occurs in engine torque, the electronic control unit sends a signal to both the motor/generator unit and to the control solenoid; and wherein, when the motor/generator unit is activated, a change in rotation of the control camshaft is caused which, due to the differential gear, is out of phase with respect to the basic camshaft and presents a phase shift that is absorbed by the control shaft which, upon rotating, exerts a force on the actuator, and the control solenoid activates the shut-off valve, enabling a passage of oil between the oil circuit and the actuator through the one-way restrictor valve, such that the actuator exerts a reaction force on the control shaft and, upon reaching equilibrium, the control solenoid is deactivated, closing the shut-off valve and leaving the control shaft out of phase at a certain angle.

2. The system for controlling internal combustion engines, according to claim 1 wherein the actuator is a cylinder divided into a first chamber and a second chamber through a piston that is joined to a rigid shaft, coaxial to a spring and located in the first chamber, wherefrom a free end of the rigid shaft projects, wherethrough it is joined to the control shaft, wherein the second chamber is joined to the oil circuit through a restrictor valve and the shut-off valve controlled by the control solenoid.

3. The control system for internal combustion engines according to claim 2, wherein a first chamber is joined to the oil circuit through a second shut-off valve controlled by the control solenoid.

4. The control system for internal combustion engines according to claim 2, wherein both the first chamber and the second chamber of the actuator comprise an additional spring to resist a force exerted by the piston.

5. The control system for internal combustion engines according to claim 1, wherein the control solenoid can be deactivated in order for the energy generated by the motor/generator unit to be used to perform a function to be selected from recharging a battery, feeding another device of the vehicle or a mixture of both of said functions.

* * * * *